United States Patent [19]

Lilimpakis

[11] Patent Number: 5,371,363

[45] Date of Patent: Dec. 6, 1994

[54] DEVICE FOR MEASURING RADIATION WITHIN A PIPE

[76] Inventor: Emmanuel Lilimpakis, Long View Rd., Box 192C, Wading River, N.Y. 11792

[21] Appl. No.: 97,566

[22] Filed: Jul. 26, 1993

[51] Int. Cl.⁵ ............... G21C 17/017; G21C 17/013; G01T 1/169

[52] U.S. Cl. .................................... 250/253; 250/266; 250/268; 250/360.1; 250/394; 104/138.2; 378/60

[58] Field of Search ............... 378/60; 250/394, 360.1, 250/268, 266, 265, 264, 256, 253; 104/138.2; 376/249

[56] References Cited

U.S. PATENT DOCUMENTS

| | | | |
|---|---|---|---|
| 4,131,018 | 12/1978 | Müller et al. ............... | 73/866.5 |
| 4,146,791 | 3/1979 | Dahl et al. ............... | 250/358.1 |
| 4,548,785 | 10/1985 | Richardson et al. ............... | 376/249 |
| 4,581,938 | 4/1986 | Wentzell ............... | 73/623 |
| 4,862,090 | 4/1989 | Vannier et al. ............... | 324/367 |
| 5,138,644 | 8/1992 | McArdle et al. ............... | 378/55 |

FOREIGN PATENT DOCUMENTS

| | | |
|---|---|---|
| 039922 | 11/1981 | European Pat. Off. . |
| 0061078 | 9/1982 | European Pat. Off. ............ 376/249 |
| 078072 | 5/1983 | European Pat. Off. . |
| 2652650 | 5/1991 | France . |

*Primary Examiner*—Constantine Hannaher
*Attorney, Agent, or Firm*—Collard & Roe

[57] ABSTRACT

A device for detecting radiation within a pipe having one or more carriages adapted for movement through the pipe. A set of radiation sensors is mounted on each carriage for detecting radiation on the interior of the pipe. The radiation sensors are positioned to cover a complete circumferential strip on the pipe interior while maintaining the geometry required to meet U.S. government criteria for the unconditional release of the pipe. Readings from the radiation sensors are transmitted out of the pipe and recorded to establish a detailed radiological survey of the pipe interior.

20 Claims, 6 Drawing Sheets

DEVICE FOR MEASURING RADIATION WITHIN A PIPE

BACKGROUND OF THE INVENTION

1. Field of the Invention

The present invention relates to a device for detecting radiation within a pipe. More specifically, it relates to a device that is pulled through embedded piping to perform radiation surveys therein.

2. The Prior Art

Nuclear facilities within the United States are licensed for operation by the Nuclear Regulatory Commission (NRC). The NRC specifies radiation contamination limits, for example, radioactive contamination limits that must be satisfied prior to termination of an NRC license. Modern nuclear power stations contain thousands of feet of exposed and embedded piping that must be surveyed in order to determine radioactive contamination levels. The cost of removing this piping is many millions of dollars, and therefore it would be advantageous to survey the internal pipe surfaces while the pipes remain embedded, for the purpose of allowing unconditional release of those pipes.

The radiation survey is most effectively carried out by a pipe crawler or a device with radiation sensors that is located within the pipe. These devices are equipped with a variety of detectors, to count alpha, beta particles and/or gamma rays. A different size pipe crawler is required to survey each size of pipe and even each schedule of pipe size.

Numerous patents have been issued pertaining to equipment for testing the integrity of pipes and pipe joints. For example, U.S. Pat. No. 4,131,081 to Müller et al, U.S. Pat. No. 4,548,785 to Richardson et al, and European Patent Application 039,922 disclose devices for ultrasonically inspecting pipes. U.S. Pat. No. 4,581,938 to Wentzell, U.S. Pat. No. 5,138,644 to McArdle et al, French Patent 2,652,650 and European Patent Application 078,072 disclose various other types of scanning and measuring equipment for pipes. However, none of these patents addresses the specific problems associated with detecting radiation within pipes.

Therefore, it would be advantageous to have a device that can pass within piping and detect radiation contamination on the internal surfaces of those pipes. It would be further advantageous to have a device that can perform detailed radiological surveys at precise locations of internal pipe surfaces. It would further be advantageous to be able to survey different size pipes and different schedules of pipes.

SUMMARY OF THE INVENTION

It is therefore an object of the present invention to provide a device for detecting radiation within a pipe that can be moved through the pipe.

It is a further object of the present invention to provide such a device that can perform detailed radiological surveys at precise locations of internal pipe surfaces.

It is a further object of the present invention to provide a device for conducting surveys in a variety of pipe sizes with detectors in the precise geometry required to satisfy the U.S. government criteria for the unconditional release of those pipes.

It is yet another object of the present invention to provide a device in which the conditions and results of the surveys can be fully recorded and documented for inspection and record retention purposes.

These and other related objects are achieved according to the invention by a device for detecting radiation on an interior pipe surface, including a carriage movable through the pipe hat has a longitudinal central axis and radii extending between the longitudinal central axis and the pipe. The device includes means for positioning the carriage centrally within the pipe. A set of radiation sensors are mounted about the central axis for detecting radiation on the interior pipe surface. The device further includes indexing means for rotating the sensor a fraction of the angle between adjacent sensors, so that a circumferential strip on the interior of the pipe in sensed. Cables are coupled to the device for moving it through the pipe and for transmitting sensor data from the device. The device maintains the radiation sensors in the geometry required for unconditional release surveys.

In smaller sized pipes, indexing of the sensors is not possible due to the limited diameter of the pipes. In an alternate embodiment, there is provided a device for detecting radiation on the interior of these smaller diameter pipes. The device includes two or more carriages coupled in spaced relation along the central axis of the device and adapted for movement through the pipe. The device includes two or more sets of sensors. Each set of sensors is mounted on one of the carriages. Each set of sensors has an angular displacement about the longitudinal central axis, with respect to the other sets of sensors. The angular displacement is dependent on the number of carriages and the number of sensors per set, so that the entire interior pipe surface is covered as the device is moved through the pipe.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
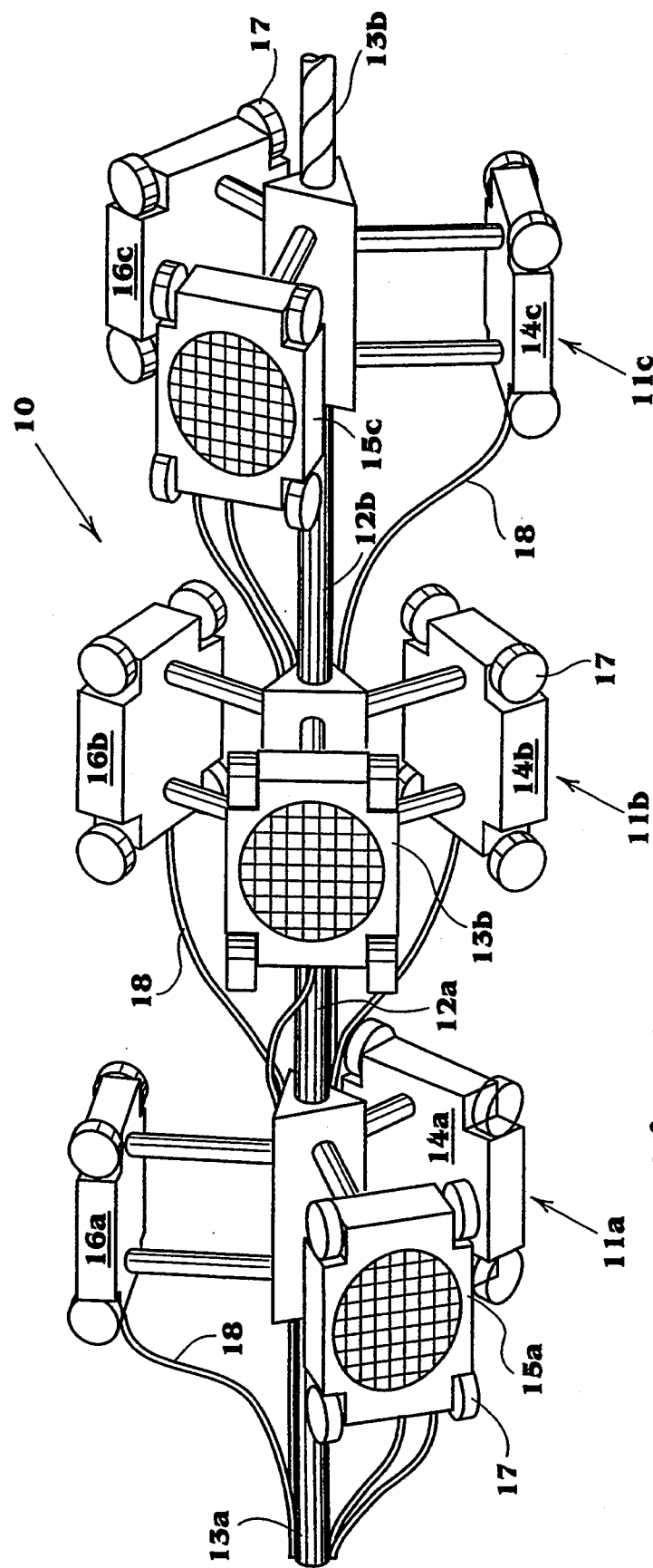
FIG. 1 is a perspective view of an embodiment of a radiation sensing device according to the invention.

Referring now in detail to the drawings and, in particular, to FIG. 1, there is shown a radiation sensing device 10 having three carriages or crawlers 11a, 11b and 11c which are coupled together by rods 12a and 12b.

Connected to the rear of carriage 11a is a cable 13a and connected to the front of carriage 11c is a cable 13b. A central axis extends through device 10 along cables 13a and 13b and rods 12a and 12b.

Radiation sensors 14a, 15a and 16a are mounted on carriage 11a equiangularly about the carriage's central axis. Similarly, radiation sensors 14b, 15b and 16b are mounted equiangularly about carriage 11b and radiation sensors 14c, 15c and 16c are mounted equiangularly about carriage 11c. Looking from the rear of device 10 along cable 13a toward cable 13b, radiation sensor 15a is located at an initial position of 0°. Radiation sensor 15b is rotated 40° counter-clockwise from radiation sensor 15a and radiation sensor 15c is rotated another 40° counter-clockwise from radiation sensor 15b. As was mentioned earlier, radiation sensors 14, 15 and 16 are each mounted equiangularly on their respective carriage 11. Thus, radiation sensor 16a is disposed 120° counter-clockwise from radiation sensor 15a and counter-clockwise from radiation sensor 15c. Radiation sensor 16b is rotated 40° counter-clockwise from sensor 16a and sensor 16c is further rotated 40° counter-clockwise from sensor 16b. Sensors 14a, 14b, and 14c are each rotated an additional 40° counter-clockwise so that sensor 14c is 40° away from sensor 15a. Thus, the nine sensors are positioned at 40° intervals around the central axis of device 10. The number of carriages and number of sensors is selected so that adjacent sensors overlap slightly to completely cover the entire inner circumference of the pipe.

As will be understood by those skilled in the art, depending on the size of the pipe, fewer or additional carriages may be required with fewer or additional sensors to provide complete and slightly overlapping coverage. For example, the smallest diameter pipes require a device having two carriages with two sensors on each carriage. The sensors on each carriage face 180° away from each other. The sensors on the first carriage are rotated 90° from the sensors on the second carriage, so that the four sensors are positioned at 90° intervals. For slightly larger pipes, the device is equipped with two carriages each having three sensors. The sensors on each carriage face 120° away from each other, with the six sensors being positioned at 60° intervals.

Each radiation sensor is equipped with one or more wheels, designated generally as wheels 17. Since the sensors are mounted equiangularly about each carriage, the radial distance between wheels 17 and the inner surface of the pipe can be closely adjusted so that each carriage fits snugly within the pipe. In this manner, the sensors can be located very close to the inner pipe surface, for example, within one-half-inch, which is critical for obtaining accurate measurements. However, the sensors are kept a slight distance away from the pipe to avoid contacting the pipe and contaminating the sensors. Since the sensors must be placed close to the pipe's inner surface without rotating about the device's central axis, device 10 is specifically designed for one size of pipe. For example, one embodiment of device 10 is designed to fit snugly within a 4" schedule 40 pipe while an alternate embodiment would be designed to fit snugly within a 4" schedule 80 pipe.

Wheels 17 are mounted on wheel axles, that are flexibly mounted to the radiation sensors, so that the wheel axles are capable of flexing to overcome weld build-up between sections of pipe or other obstacles within the pipe. Optionally, the entire sensor/wheel assembly is spring loaded on the carriage, for example, with a pin/coil spring assembly. In this manner, the sensor/wheel assemblies can be compressed together against the biasing force of the coil spring to place the device into a 4" diameter pipe. The nine sensors provide approximately 150% coverage inside the 4" diameter pipe. The device can be pulled into a 6" pipe with the sensor/wheel assemblies springing open to provide 100% coverage along the 6" pipe. Such an embodiment allows a single device to survey two diameters of pipe in a single pass.

After device 10 is placed into the pipe, cables 13a and 13b are used to advance device 10 through the pipe in a push-pull arrangement. Rods 12a and 12b between carriages 11a, 11b and 11c, allow movement of the carriages with respect to each other, so that device 10 can negotiate curves. However, rods 12a and 12b prevent rotation of the carriages with respect to each other so that even around tight curves, the sensors maintain their phase relationship with each other. As device 10 moves through the pipe, sensor data is transmitted along wires, designated generally as wires 18. Each sensor is connected to its own separate wire. Wires 18 are strapped to cable 13a and extend along the length of cable 13a out of the pipe to monitoring and recording equipment.

Figure 2:
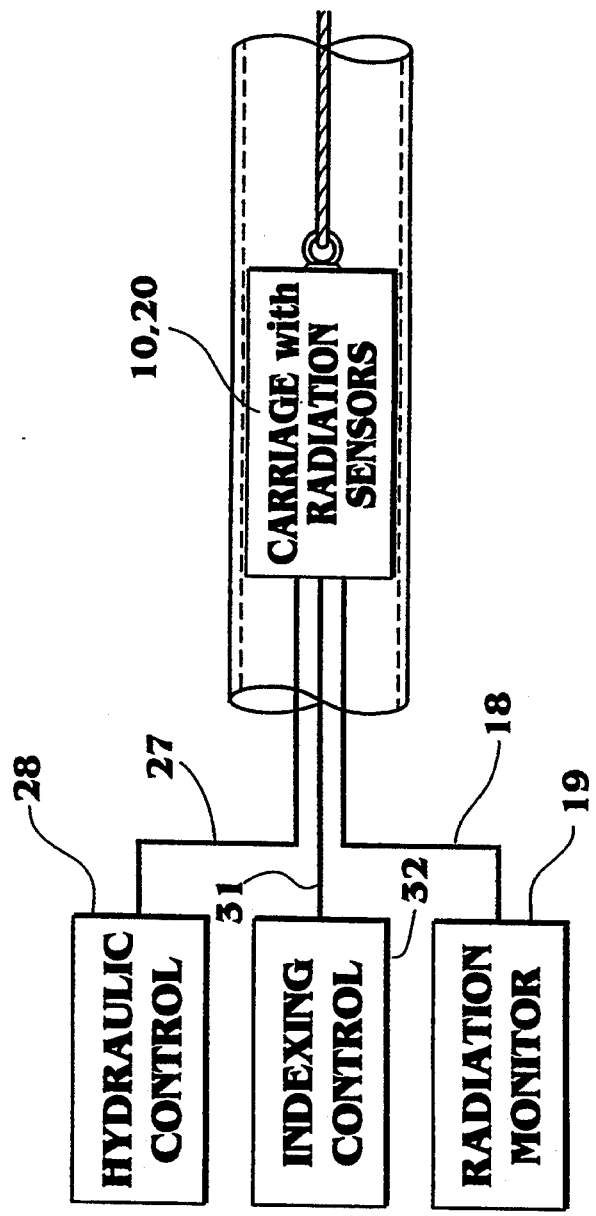
FIG. 2 is a schematic showing various control systems for the radiation sensing device.

As can be seen in FIG. 2, wires 18 extend from the back of device 10 and are coupled to a radiation monitor 19 for monitoring and recording the sensor readings.

Figure 3:
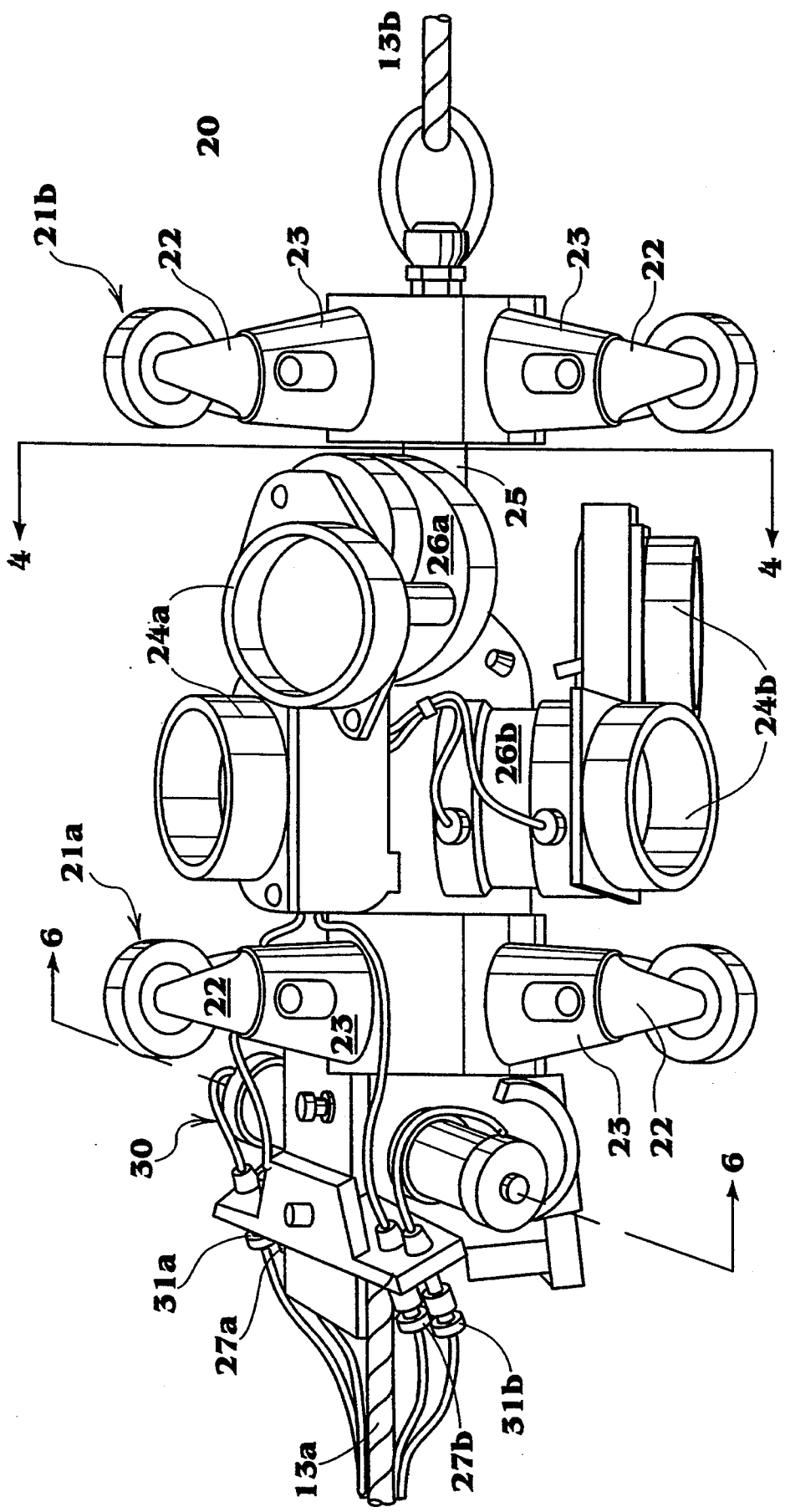
FIG. 3 is a perspective view of a further embodiment of the radiation sensing device.

Referring now to FIG. 3, there is shown an alternate embodiment of a radiation sensing device 20 including two sets of spring loaded wheel assemblies 21a and 21b. Each set of wheels includes three wheels mounted equiangularly about the central axle or axis 25 of device 20. Wheel assembly 21b is freely rotatable about axle 25 to help the device through turns. As device 20 is placed into the pipe, wheel support members 22 are forced radially into collars 23 against the biasing force of a coil spring, for example. The radially outward biasing force of the springs presses the wheels firmly against the pipe interior and prevent axial rotation of device 20 while allowing longitudinal movement along the pipe. Between wheels 21a and 21b there are three sets of sensors 24a and 24b, the third set not being visible in the drawing, rotatably mounted about central axle 25 of device 20. Each set of sensors is attached to a piston 26a, 26b and 26c, respectively, of which only 26a and 26b are visible in the drawing. Pistons 26 move sensors 24 radially between an extended position where sensors 24 are in close proximity or in contact with the interior pipe surface, and a retracted position where sensors 24 are spaced from the interior pipe surface retracted sufficiently for turning and rotating. Pistons 26 are extended and retracted hydraulically or pneumatically through control lines 27a and 27b. Since pistons 26 are intended to extend and retract synchronously, a single pair of hydraulic or pneumatic lines 27a and 27b is sufficient to drive all pistons. Hydraulic or pneumatic lines 27a and 27b extend rearwardly from device 20 out of the pipe.

Sensors 24a, 24b and 24c are each located 120° from each other. An indexer 30, fixed to wheel assembly 21a, rotates sensors 24 about axle 25. Indexer 30 is controlled by hydraulic lines or pneumatic 31a and 31b which extend out of the pipe. With sensors 24 in the retracted position, indexer 30 rotates the sensor 60°0 or one-half the distance between adjacent sensors. Following rotation by indexer 30, pistons 26 are extended to place sensors 24 in contact with the interior pipe surface. After the reading is taken, pistons 26 retract and cables 13a and 13b advance device 20 slightly forward in a push-pull arrangement. Pistons 26 are extended to take a sensor reading and then retracted. Indexer 30 then rotates sensors 24 which are subsequently extended for reading and then retracted. In this manner, device 20 moves along the pipe interior while completely covering axially located circumferential strips. Device 20 is suited for pipes having a diameter of approximately 8", for example. The overall length of device 20 is sufficiently short so that device 20 can negotiate curves within 8" piping.

As can be seen in FIG. 2, piston hydraulic lines 27 extend from device 20 to a hydraulic or pneumatic control 28a. Hydraulic or pneumatic lines 31 extend from indexer 30 to indexing control 32. Hydraulic or pneumatic control 28, indexing control 32 and radiation monitor 19 sequentially extend sensors 24 to obtain readings and retract sensors 24 for indexing and advancement of device 20 through the pipe.

Figure 4:
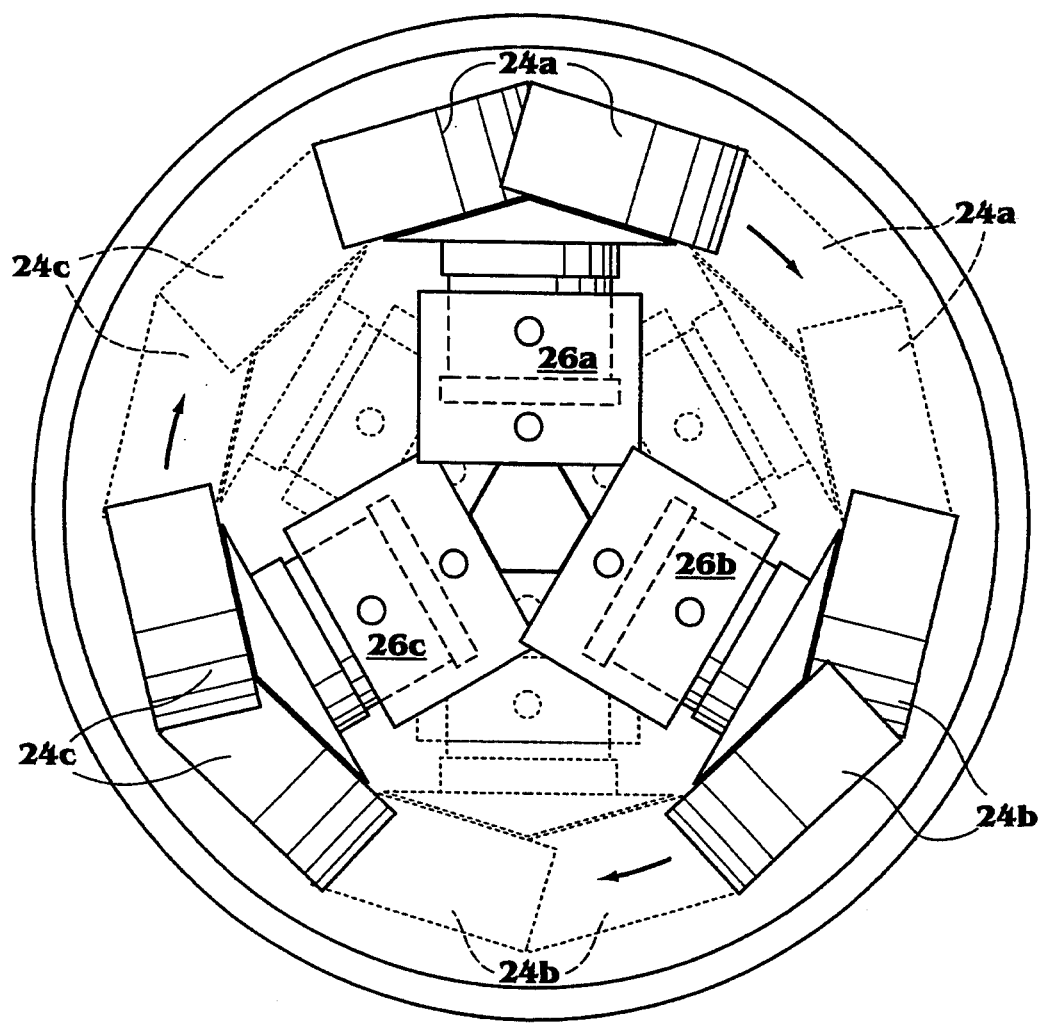
FIG. 4 is a cross-sectional view taken along the line 4—4 from FIG. 3 showing sensor indexing to cover a complete circumferential strip of the interior pipe surface.

As can be seen in FIG. 4, sensors 24a, 24b and 24c are shown in solid line in the retracted position. Indexer 30 rotates sensors 24 into the positions shown in dotted line. As can be appreciated, the solid line positions and dotted line positions overlap to completely cover a circumferential strip of the pipe interior. In order to take a reading, pistons 26 extend to place sensors 24 directly against the interior pipe surface. The sensors are subsequently retracted by pistons 26 and either indexed or moved longitudinally through the pipe before being subsequently extended for the next reading. In between sensor readings, the pistons are alternately indexed and moved longitudinally along the pipe.

Figure 5:
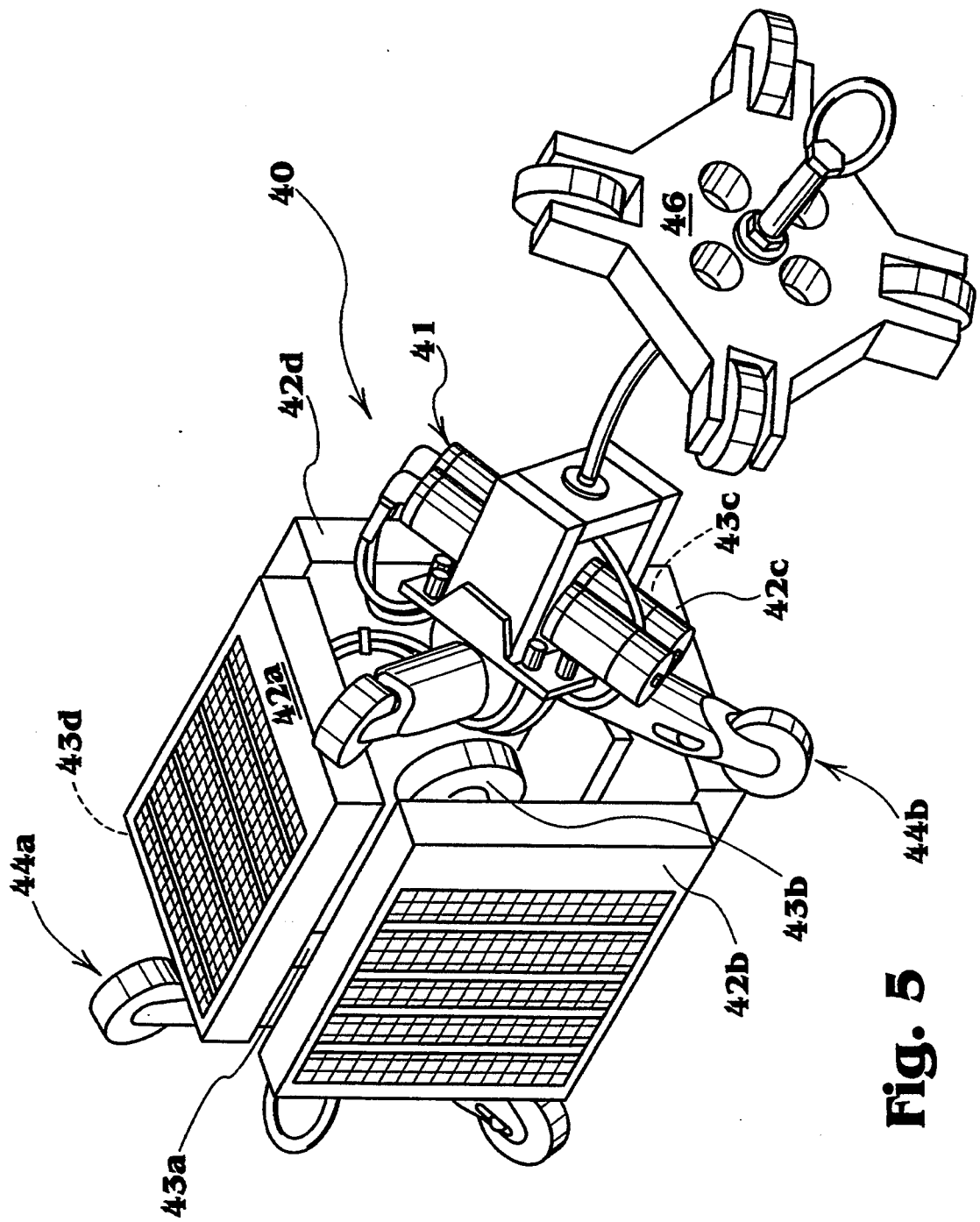
FIG. 5 is a perspective view of a further embodiment of the radiation sensing device.

FIG. 5 shows a further embodiment of the radiation sensing device 40 designed for even larger pipes. Device 40 includes a lead carriage 46 designed to assist device 40 in negotiating tight curves. Each embodiment is ideally provided with a lead carriage. Device 40 includes an indexer 41, which may be a double barreled indexer capable of rotating the larger sensors 42a, 42b, 42c and 42d. Each sensor is mounted on a piston 43a, 43b, 43c and 43d, respectively. The sensors and pistons are supported between sets of wheels 44a and 44b, which keep the sensors centered within the pipe. Device 40 is suitable for use in 10" to 12" diameter pipes. For larger pipes up to 24" the device may be equipped with eight sensors arranged equiangularly about the central axis of the device to form a hexagon. Since each of the eight sensors is disposed at an angle of 45° with respect to the adjacent sensor, the indexing would only rotate the sensors 22½°.

Figure 6:
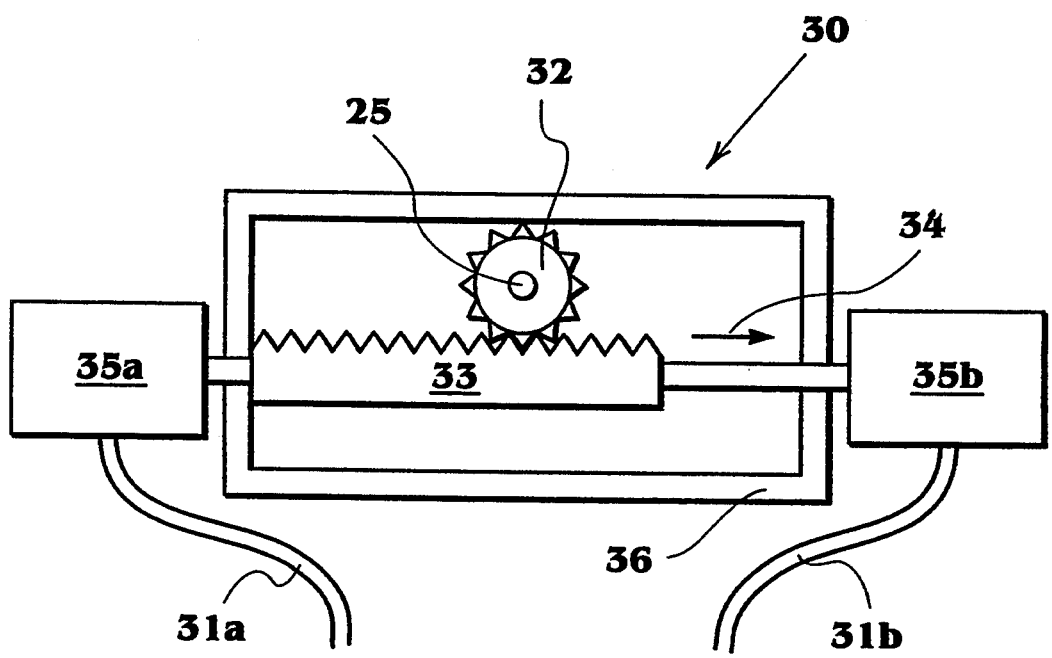
FIG. 6 is a cross-sectional view taken along the line 5—5 from FIG. 3 showing the indexing mechanism for rotating the sensors.

FIG. 6 shows indexer 30 coupled to hydraulic or pneumatic lines 31a and 31b. A gear 32 is concentrically mounted on the back end of axle 25. A rack 33 is correspondingly configured to engage the teeth of gear 32. Rack 33 is shown in its left most terminal position, but may be moved along direction 34 to a right most terminal position. By injecting pressurized fluid through hydraulic line 31a into cylinder 35a, a piston coupled to the left side of rack 33, is moved to the right in direction 34. This causes a counter-clockwise rotation of gear 32 which rotates sensors 24. The width of housing 36 as well as the selection of the pitch of the teeth on gear 32 and rack 33, determine through what angle gear 32 will rotate during movement of rack 33. Fluid can be alternately pumped through lines 31a and 31b to move rack 33 between its two terminal positions. Pressure is maintained in one of the lines during operation of the sensors to insure that the sensors are properly indexed. Rack 33 is equipped with adjusting screws to limit and/or adjust its travel to obtain precise rotation of gear 32 and axle 25.

Optionally, a sensor may be mounted within housing 36 to positively determine when rack 33 has reached its terminal position. Once rack 33 is in the terminal position, a locking pin may also be actuated to hold rack 33 in its terminal position until the sensor reading is complete. Subsequently, the pistons can be retracted and the pin can be removed and rack 33 moved.

Sensors 14, 15, 16, 24 and 42 may be any type of sensors to perform characterization and determine contamination level of a surface. The sensors may be used to detect alpha, beta or gamma radiation. For example, Geiger Muller pancake detectors may be used to detect beta particles while scintillators or sodium iodide scintillators may be used to detect gamma radiation.

While several embodiments of the present invention have been shown and described, it is to be understood that many changes and modifications may be made thereunto without departing from the spirit and scope of the invention as defined in the appended claims.

What is claimed is:

1. A device for sensing radiation on an interior pipe surface having a substantially circular cross-section, the device comprising:
   a carriage, movable through the pipe, having a front end, a back end, a longitudinal central axis and radii extending between said longitudinal central axis and the pipe;
   at least two guide arms coupled to said carriage, each having a wheel rotatably mounted thereon, said guide arms being biased along a radius of said carriage toward the pipe so that said wheels contact the pipe and position said central axis of said carriage concentrically within the pipe;
   a set of pistons mounted on said carriage equiangularly about said central axis within a single plane and adapted for radial extension and retraction, each piston having a carriage end and a free end spaced from said carriage end;
   a radiation sensor mounted on said free end of each piston for detecting radiation on the interior pipe surface when said set of pistons are extended;
   a rack connected to said set of pistons and a rotatable gear coupled to said carriage and cooperatively dimensioned to engage said rack, whereby said gear rotates to move said rack and rotate said set of retracted pistons and sensors one half of the angle between adjacent pistons to cover a complete circumferential strip on the interior of the pipe;
   a first cable means coupled to said back end of said carriage and electrically connected to said sensors for transmitting sensor data out of the pipe; and
   a second cable coupled to said front end of said carriage for discretely pulling said carriage through the pipe, whereby between moves said sensors cover a complete circumferential strip on the interior of the pipe at each location in the geometry required to meet pre-determined criteria.

2. The device according to claim 1, additionally comprising:
   a pair of radiation sensors mounted on said free end of each piston for sensing radiation when said set of pistons are extended;
   each of said pistons including a central piston axis and a piston plane that intersects said central piston axis and said carriage central axis;

whereby each pair of sensors has one sensor located on one side of the respective piston plane and the other sensor located on the other side of the piston plane symmetrical with the one sensor.

3. A device having a longitudinal central axis sensing radiation on an interior pipe surface having a substantially circular cross-section, the device comprising:
   a first carriage movable through the pipe and having a front end, a back end, and a first set of radiation sensors mounted equiangularly about the central axis for sensing radiation on the interior pipe surface;
   a second carriage coupled a first distance from said back end of said first carriage and having a second set of radiation sensors mounted equiangularly about the central axis for sensing radiation on the interior pipe surface, said second set of sensors being rotated in a first direction one-third of the angle between adjacent sensors of said first set of sensors;
   a third carriage with a front end coupled a second distance from said second carriage and having a back end, and a third set of sensors mounted equiangularly about the central axis for sensing radiation on the interior pipe surface, said third set of sensors being rotated in a first direction two-thirds of the angle between adjacent sensors of said first set of sensors;
   a first cable coupled to said back end of said third carriage and electrically connected to said sensors for transmitting sensor data out of the pipe; and
   a second cable coupled to said front end of said first carriage for pulling said carriages through the pipe, whereby said sensors cover a complete circumferential strip on the interior pipe surface.

4. A device for detecting radiation on an interior pipe surface, comprising:
   a carriage movable through the pipe having a longitudinal central axis and radii extending between said longitudinal central axis and the pipe;
   means for positioning said carriage centrally within the pipe;
   a set of radiation sensors mounted about said central axis for detecting radiation on the interior pipe surface;
   indexing means for rotating said set of radiation sensors a fraction of the angle between adjacent sensors, so that a circumferential strip on the interior of the pipe is sensed; and
   cable means coupled to said carriage for moving said carriage through the pipe and transmitting sensor data out of the pipe.

5. The device according to claim 4, wherein said set of sensors are mounted equiangularly within a single plane disposed perpendicular to said carriage central axis.

6. The device according to claim 5, further comprising means for radially extending and retracting said set of sensors.

7. The device according to claim 6, wherein said set of sensors is movable between an extended position for sensing radiation and a retracted position for rotation by said indexing means and movement by said cable means.

8. The device according to claim 7, wherein said means for radially extending and retracting said set of sensors comprises:
   a set of pneumatic pistons each having a carriage end attached to said carriage and a free end spaced from said carriage end.

9. The device according to claim 8, wherein each piston has a sensor mounted at its free end.

10. The device according to claim 9, wherein each piston includes a central piston axis and a piston plane that intersects said central piston axis and said carriage central axis; and
   each piston has a pair of sensors mounted at its free end, one sensor of each pair being on one side of said respective piston plane and the other sensor of each pair being on the other side of said respective piston plane.

11. The device according to claim 10, wherein the sensors of each pair are mounted symmetrically about said piston plane with respect to each other, with each sensor facing generally away from said piston plane.

12. The device according to claim 11, wherein said indexing means comprises:
   a rack connected to said set of pistons; and
   a rotatable gear coupled to said carriage and cooperatively dimensioned to engage said rack and rotate said retracted pistons and said sensors.

13. The device according to claim 12, wherein said retracted pistons and said sensors are rotated one half the angle between adjacent pistons.

14. The device according to claim 13, wherein said means for positioning comprises:
   at least two spring loaded guide arms coupled to said carriage, each guide arm having a wheel rotatably mounted thereon for contacting the interior pipe surface, said guide arms being biased toward the pipe so that the carriage central axis is concentrically positioned within the pipe.

15. A device having a longitudinal central axis for detecting radiation on an interior pipe surface comprising:
   two carriages coupled in spaced relation along said central axis and adapted for movement through the pipe;
   two sets of sensors, each set being mounted on one of said two carriages for detecting radiation on the interior pipe surface;
   each set of sensors having an angular displacement, about the longitudinal central axis, with respect to the other sets of sensors, the angular displacement being dependent on:
   a) the number of carriages, and
   b) the number of sensors per set, so that a complete circumferential strip the entire interior pipe surface is covered as said carriages are moved through the pipe.

16. The device according to claim 15, wherein said sensors of each set are mounted symmetrically about the longitudinal central axis.

17. The device according to claim 16, wherein each set of sensors includes two sensors disposed at 180° to each other, whereby the angular displacement between adjacent sets is 90°, i.e., (360°÷[2×2]).

18. The device according to claim 16, wherein each set of sensors includes three sensors disposed at 120° to each other, whereby the angular displacement between adjacent sets is 60°, i.e., (360°÷[2×3]).

19. The device according to claim 16, wherein the device includes three carriages and each set of sensors includes three sensors disposed at 120° to each other, whereby the angular displacement between adjacent sensors is 40°, i.e. (360°÷[3×3]).

20. A device for detecting radiation within a pipe, comprising:
   a carriage adapted for movement through the pipe;
   a set of radiation sensors mounted on said carriage for detecting radiation on an interior pipe surface;
   means for positioning said set of radiation sensors to cover a complete circumferential strip on the interior pipe surface; and
   means for transmitting the radiation sensor readings out of the pipe and recording the sensor readings to establish a detailed radiological survey of the interior pipe surface.

* * * * *